(12) United States Patent
Heitmann et al.

(10) Patent No.: US 8,950,168 B2
(45) Date of Patent: Feb. 10, 2015

(54) HYBRID YARN FOR PRODUCING MOLDED PARTS

(75) Inventors: Uwe Heitmann, Göppingen (DE); Heinrich Planck, Nürtingen (DE)

(73) Assignee: Deutsche Institute fur Textil-und Faserforschung Denkendorf, Denkendorf (DE)

( * ) Notice: Subject to any disclaimer, the term of this patent is extended or adjusted under 35 U.S.C. 154(b) by 269 days.

(21) Appl. No.: 13/695,329

(22) PCT Filed: Apr. 27, 2011

(86) PCT No.: PCT/EP2011/056650
§ 371 (c)(1),
(2), (4) Date: Jan. 8, 2013

(87) PCT Pub. No.: WO2011/134995
PCT Pub. Date: Nov. 3, 2011

(65) Prior Publication Data
US 2013/0104515 A1    May 2, 2013

(30) Foreign Application Priority Data
Apr. 30, 2010  (DE) .......................... 10 2010 028 433

(51) Int. Cl.
| | |
|---|---|
| D02G 3/38 | (2006.01) |
| B29C 70/50 | (2006.01) |
| D02G 3/36 | (2006.01) |
| D02G 3/40 | (2006.01) |
| B29B 15/12 | (2006.01) |

(52) U.S. Cl.
CPC *D02G 3/38* (2013.01); *B29C 70/50* (2013.01); *D02G 3/36* (2013.01); *D02G 3/402* (2013.01); *B29B 15/12* (2013.01)
USPC .................................. 57/224; 57/229; 57/252

(58) Field of Classification Search
USPC ............ 57/210, 224, 229, 252, 255; 428/222, 428/364
See application file for complete search history.

(56) References Cited

U.S. PATENT DOCUMENTS

| | | | |
|---|---|---|---|
| 5,464,684 A | 11/1995 | Vogelsang et al. | |
| 6,230,524 B1 * | 5/2001 | Kolmes et al. | 66/172 R |
| 6,606,846 B2 * | 8/2003 | Land | 57/5 |
| 2006/0177656 A1 | 8/2006 | Kolmes et al. | |

FOREIGN PATENT DOCUMENTS

| | | |
|---|---|---|
| CA | 2 368 046 | 8/2000 |
| DE | 44 12 376 A1 | 10/1995 |
| DE | 195 37 703 A1 | 4/1997 |
| DE | 196 21 030 A1 | 11/1997 |
| DE | 196 24 412 A1 | 1/1998 |
| GB | 2 105 427 | 3/1983 |
| GB | 2 477 531 | 8/2011 |

* cited by examiner

OTHER PUBLICATIONS

International Preliminary Report on Patentability, Nov. 15, 2012.
German Patent Office Search Report, Aug. 3, 2011.

*Primary Examiner* — Shaun R Hurley
(74) *Attorney, Agent, or Firm* — Dority & Manning, P.A.

(57) ABSTRACT

A hybrid yarn for producing molded parts having a thermoplastic matrix and reinforcing fibers embedded therein. The hybrid yarn includes a core substantially made of staple fibers aligned in a straight line in the longitudinal direction of the hybrid yarn, and a cover made substantially of staple fibers wound helically about the core. The staple fibers forming the core and the staple fibers forming the cover each are made of an intimate mixture of thermoplastic matrix fibers and reinforcing fibers.

18 Claims, 2 Drawing Sheets

HYBRID YARN FOR PRODUCING MOLDED PARTS

FIELD OF THE INVENTION

The present invention relates to a hybrid yarn for producing molded parts having a thermoplastic matrix and reinforcing fibres embedded therein.

BACKGROUND

A yarn is generally understood to be a strand-like fibre bundle, the fibres of which are consolidated by twisting. A hybrid yarn is such a yarn that comprises at least two different types of fibres. Special hybrid yarns are known, among other, that are suitable for producing molded parts having a thermoplastic matrix and having reinforcing fibres embedded therein. A molded part is thereby understood to be a workpiece remaining in a structural shape prescribed by the production process after being produced.

In a known method for producing such molded parts, a hybrid yarn comprising both thermoplastic matrix fibres and reinforcing fibres is first processed to form a textile web material. The reinforcing fibres thereby have a greater specific tensile strength and higher melting or decomposition temperature than the thermoplastic matrix fibres. The textile web material is then placed into a molding tool, such as a press, and heated so that the thermoplastic matrix fibres melt, but the reinforcing fibres do not. A uniform thermoplastic liquid comprising embedded reinforcing fibres thereby first arises from the originally discrete thermoplastic matrix fibres and takes on a shape prescribed by the molding tool. After cooling and hardening, the now consolidated thermoplastic matrix fibres form a uniform thermoplastic matrix in which the reinforcing fibres are embedded.

The mutual interaction of the thermoplastic matrix and the reinforcing fibres thus gives rise to a molded part having mechanical properties that are superior to the properties of the two components. A particularly good ratio of strength to weight is a particular result. There is nevertheless a need for further improved molded parts.

SUMMARY

An object of the present invention is to provide a hybrid yarn allowing the production of improved molded parts having a thermoplastic matrix and having reinforcing fibres embedded therein. Objects and advantages of the invention are set forth in part in the following description, or may be obvious from the description, or may be learned through practice of the invention.

The objects are achieved by a hybrid yarn of the type indicated above. The yarn has a core made substantially of staple fibres disposed in a straight line in a longitudinal direction of the hybrid yarn, and a cover made substantially of staple fibres wound helically about the core, wherein the staple fibres forming the core and the staple fibres forming the cover are each made of an intimate mixture of thermoplastic matrix fibres and reinforcing fibres.

The hybrid yarn according to the invention comprises a core and a cover disposed about the core. Both the core and the cover are thereby made at least substantially of staple fibres. Staple fibres are understood here to be individual fibres limited in length. The cover can thereby comprise such a high number of staple fibres per unit length that the cover forms a closed layer by which the staple fibres of the core are completely covered. However, there can also be such a low number of staple fibres per unit length in the cover that the staple fibres of the core remain at least partially visible through intermediate spaces between the staple fibres of the cover.

Molded parts produced from hybrid yarns comprising staple fibres have a greater strength transverse to the longitudinal direction of the yarns than such molded parts that are produced from hybrid yarns made of endless fibres, also called filaments. For molded parts in particular that are produced from textile web materials disposed in layers, the adhesion of the individual layers is improved.

Hybrid yarns having staple fibres further comprise a lower proportion of hollow space than hybrid yarns having endless fibres, reducing the risk of undesired air inclusions when molding the molded part, that is, when consolidating the textile web material. The strength of the molded part is thereby improved.

Textile web materials produced from hybrid yarns comprising staple fibres are also more drapable than their counterparts made from filaments. Wrinkle-free placement of the textile web material in the molding tool is thereby made easier, wherein the risk of damage to the structure of the textile web material is reduced at the same time. In this manner, the production costs of the molded part can be reduced. Molded parts having complex shapes can thus be produced from textile web materials, because the textile web materials better conform to the contour of the molding tool.

The use of staple fibres further reduces the risk that the fibres will be kinked during further processing, particularly when draping. This is advantageous, in turn, for the strength of the subsequent molded part.

Because both the core and the cover of the hybrid yarn are made of staple fibres, the indicated advantages obtainable by using staple fibres can be maximized.

The arrangement of staple fibres in a straight line in the core in the longitudinal direction of the hybrid yarn further brings about greater strength in the subsequent molded part in the longitudinal direction of the hybrid yarn, particularly a greater tensile strength, than would be possible when using conventional hybrid yarns wherein the fibres are twisted over the entire cross section. The reason for this is that a substantial proportion of reinforcing fibres in the molded part, namely the reinforcing fibres of the core of the hybrid yarn, run parallel to each other in the longitudinal direction of the hybrid yarn.

If the hybrid yarn is then disposed in the textile web material so that the longitudinal direction thereof corresponds at least in segments to a main loading direction of the subsequent molded part, then the molded part can better resist mechanical loads. In this manner, the ratio of mechanical strength to weight of the molded part can be improved.

The hybrid yarn according to the invention can indeed, under certain conditions (rotation coefficient, yarn fineness, etc.), have a lower strength than a corresponding hybrid yarn wherein the fibres are twisted uniformly over the entire cross section, but this is of secondary importance because the strength of the molded part is increased by consolidating the thermoplastic matrix fibres, among other things, and therefore is substantially independent of the strength of the hybrid yarn. The strength of the hybrid yarn must, however, be high enough that further processing into a textile web material and further into a molded part is possible. The required strength is ensured for the hybrid yarn according to the invention in that the staple fibres forming the cover are wound helically about the core and therefore are twisted as a result.

The reinforcing fibres present in the cover thereby improve the strength of the subsequent molded part transverse to the longitudinal direction of the hybrid yarn captured therein relative to such molded parts produced from hybrid yarns made of endless fibres. For molded parts that are produced from textile web materials disposed in layers, the adhesion of the individual layers can thereby be improved.

The staple fibres forming the core, just as the staple fibres forming the cover, are made of an intimate mixture of thermoplastic matrix fibres and reinforcing fibres. An intimate mixture of fibres of different types is thereby understood to be a mixture such that a substantially homogenous mixture is present at the level of the individual fibres. This means that the fibres of the different types are mixed together so that groupings of exclusively identical types of fibres substantially no longer occur. The intimate mixture or the intimate mixtures can thereby take place prior to the actual formation of the hybrid yarn. The use of staple fibres thereby makes it easier to produce uniform mixtures, which can be produced by means of a spinnery preparation machine, for example, such as by means of a mixing machine or a doubling draw unit.

The use of intimate mixtures ensures that the thermoplastic matrix fibres and the reinforcing fibres are homogenously distributed in the textile web material produced from the hybrid yarn In this manner, it can be achieved that the reinforcing fibres are completely coated when the thermoplastic matrix fibres are melted, so that the interaction between the thermoplastic matrix and the reinforcing fibres in the subsequent molded part are maximized by improved adhesive bonding, and so that a molded part having high mechanical strength and simultaneously low weight is produced.

According to an advantageous refinement of the invention, the volume-based proportion of the reinforcing fibres in the intimate mixture is at least 40%, preferably at least 45%, particularly preferably at least 50%. It is thereby possible to produce a molded part having particularly high strength from the hybrid yarn.

According to an advantageous refinement of the invention, the volume-based proportion of the thermoplastic matrix fibres in said intimate mixture is at least 20%, preferably at least 30%, particularly preferably at least 35%. In this manner, it can be ensured that the reinforcing fibres are each completely enclosed by the thermoplastic matrix after consolidating the thermoplastic matrix fibres, improving the adhesive bond of the thermoplastic matrix and the reinforcing fibres, and thus benefiting the mechanical properties of the molded part.

According to a practical refinement of the invention, the staple fibres forming the core and the staple fibres forming the cover correspond with respect to the intimate mixtures thereof. This means that the proportion of thermoplastic matrix fibres in the core is equal to the proportion of thermoplastic matrix fibres in the cover, and that the proportion of reinforcing fibres in the core is equal to the proportion of reinforcing fibres in the cover. The thermoplastic matrix fibres in the core and in the cover further correspond with respect to the materials and the dimensions thereof, as do the reinforcing fibres in the core and in the cover. In this manner, the production of molded parts is made easier, because the core and the cover can thus be produced from one initial mixture. A homogenous implementation of the thermoplastic matrix in the subsequent molded part can also thus be ensured, to the benefit of the mechanical properties thereof.

According to a practical refinement of the invention, the sum of the volume-based proportion of thermoplastic matrix fibres and the volume-based proportion of reinforcing fibres in the hybrid yarn is at least 90%, preferably at least 95%, particularly preferably at least 98%. In this manner, molded parts having particularly high strength and low weight can be produced. The remaining volume proportions can be due to a sizing or binding agent. A sizing agent is thereby understood to be a typically viscous coating that protects the hybrid yarn against mechanical effects, particularly in further processing into a textile web material. A binding agent is further understood to be a coating improving the adhesive bond arising between the matrix and the reinforcing fibres during melting and cooling of the thermoplastic matrix.

According to an advantageous refinement of the invention, the staple fibres forming the core and/or the staple fibres forming the cover comprise a length of at least 2.5 cm, preferably of at least 5 cm, particularly preferably of at least 10 cm, and/or a length of no greater than 25 cm, preferably no greater than 20 cm, particularly preferably no greater than 15 cm. Such staple lengths lead to particularly strong molded parts. In addition, such staple fibres can be produced and further processed by means of conventional machines.

According to a practical refinement of the invention, the thermoplastic matrix fibres comprise a maximum yarn count based tensile strength of at least 20 cN/tex, preferably of at least 30 cN/tex, particularly preferably of at least 50 cN/tex. The maximum tensile strength is thereby that tensile load at which a fibre is just about to fail. In this manner, it can be brought about that the matrix having a specific maximum tensile strength corresponding to the thread count based maximum tensile strength of the thermoplastic fibres can withstand mechanical loads arising in the finished molded part, particularly transverse to the adjacent reinforcing fibres, further improving the strength of the molded part.

According to a practical refinement of the invention, the thermoplastic matrix fibres comprise polyurethane fibres (particularly fibres made of PU), polyamide fibres (particularly fibres made of PA), polyether ketone fibres (particularly fibres made of PAEK and of derivatives thereof, particularly PEEK, PEK, PEEEK, PEEKEK, PEKK), polypropylene fibres (particularly fibres made of PP), acryl nitrile butadiene styrene fibres (particularly fibres made of ABS), and/or polyester fibres (particularly fibres made of PES and of derivatives thereof, particularly PBT, PC, PET, PEN. Such materials particularly meet the requirements with respect to strength, are low in cost, and can be processed easily.

According to an advantageous refinement of the invention, the thermoplastic matrix fibres are made of a single material. In this manner, a homogenous thermoplastic matrix is produced in a simple manner in the finished molded part, thereby improving the mechanical properties thereof.

According to a practical refinement of the invention, the reinforcing fibres comprise a maximum yarn count based tensile strength of at least 100 cN/tex, preferably of at least 150 cN/tex, particularly preferably of at least 200 cN/tex. In this manner, the molded part produced therefrom can withstand particularly high mechanical loads, particularly in the fibre direction.

According to a practical refinement of the invention, the reinforcing fibres comprise glass fibres, carbon fibres, and/or aramide fibres. Such materials particularly meet the requirements for reinforcing fibres, particularly with respect to strength, are low in cost, and can be processed easily. Other high-modules fibres are also possible, however.

According to an advantageous refinement of the invention, the reinforcing fibres are made of a single material. In this manner, the properties of a material suitable for reinforcing fibres can be best utilized.

According to a practical refinement of the invention, the rotation coefficient $\alpha_m$ of the hybrid yarn is no greater than 200, preferably no greater than 170, particularly preferably no greater than 150, and/or at least 70, preferably at least 90, particularly preferably at least 110. The rotation coefficient is derived according to the formula $$\alpha_m = T/Nm^{1/2}$$

where T is the number of rotations per meter of yarn length and $Nm^{1/2}$ is the root of the metric yarn number. In the ranges indicated, the hybrid yarn generally has good strength, allowing the proportion of staple fibres in the cover to be kept low relative to the total staple fibres. Conversely, the proportion of staple fibres in the core relative to the total staple fibres can be increased, which serves to increase the strength of the subsequent molded part.

According to a practical refinement of the invention, the hybrid yarn comprises a total titer of at least 100 dtex, preferably of at least 150 dtex, particularly preferably of at least 200 dtex, and/or of no greater than 15000 dtex, preferably no greater than 12000 dtex, particularly preferably no greater than 10000 dtex. Hybrid yarns having a total titer in the ranges indicated are particularly good for producing textile web materials. As a rule, the yarns have the strength required for further processing. Nevertheless, even thin-walled molded parts can be produced from the textile web materials obtained therefrom. If thicker-walled molded parts are to be produced, then a plurality of the textile web materials thus obtained can be disposed in layers and particularly jointly consolidated. Hybrid yarns having such a total titer can further be processed on conventional textile machines.

According to an advantageous refinement of the invention, the proportion of the staple fibres forming the cover is at least 2%, preferably at least 5%, particularly preferably at least 15%, and/or is no greater than 45%, preferably no greater than 35%, particularly preferably no greater than 25% with respect to the staple fibres. In the ranges indicated, the hybrid yarn generally has sufficient strength for further processing, and at the same time comprises a high proportion of staple fibres and thus a high proportion of reinforcing fibres in the core, so that particularly stable molded parts can be produced therefrom.

According to a practical refinement of the invention, the snarling tendency of the hybrid yarn is no greater than 200 1/m, preferably no greater than 180 1/m, particularly preferably no greater than 160 1/m. The snarling tendency is the tendency of the yarn, brought about by the rotation thereof, to twist together when suspended freely in a loop between two points. In order to measure the snarling tendency, yarn segments of 500 mm in length can be used, for example, and the ends thereof clamped so that the yarn segment is disposed horizontally. A weight can then be suspended in the center and the yarn ends moved toward each other. The weight then begins to rotate and the rotations can be counted by means of a light sensor, until the direction of rotation reverses. The values of 10 measurements are evaluated and output as one measured value. Hybrid yarns having the indicated values of snarling tendency can be further processed particularly well. Textile web materials produced therefrom can particularly be easily placed in a molding tool without wrinkling.

According to a particularly advantageous refinement of the invention, the hybrid yarn is produced by means of an air-jet spinning process. In an air-jet spinning process, a substantially non-twisted fibre bundle is drawn to the desired fineness and fed through an airflow providing a false twist to the drawn fibre bundle. The outer fibres of the drawn fibre bundle are thereby twisted substantially more than the inner fibres. When the drawn fibre bundle is further transported, the false twist is relieved, wherein a core of the yarn so produced practically completely loses the twist thereof. A permanent twist remains in a cover of the yarn, however, holding the yarn together. The yarns thus obtained comprise high uniformity.

The hybrid yarn according to the invention can be produced simply in that a fibre bundle made of an intimate mixture of thermoplastic matrix fibres and reinforcing fibres are fed to an air-jet spinning machine. The core and cover of the hybrid yarn are then formed simultaneously from a joint fibre source when transiting the air-jet spinning machine, namely from the fibre bundle presented to the air-jet spinning machine. In this manner, the hybrid yarn according to the invention can be produced at a low cost but having uniform shape. The advantages apply particularly with respect to the use of rewinding devices, wherein the fibres forming the core of the yarn and the fibres forming the cover are fed in separately.

According to a practical refinement of the invention, the air-jet spinning process is a dual jet air-jet spinning process. For such a method, the false twist generated by means of a first rotation jet is relieved by means of a second rotation jet acting in the opposite direction. Such methods are particularly suitable for producing hybrid yarn from longer staple fibres having a low proportion of fibres in the cover.

According to a practical refinement of the invention, the air-jet spinning process is a single jet air-jet spinning process. For such a method, the yarn is formed by means of only one rotation jet disposed so that part of the outer fibres are spread apart prior to twisting. The spread fibres are then wound about the core when backing. Such methods are particularly suitable for producing hybrid yarn from shorter staple fibres having a high proportion of fibres in the cover.

In a further consideration, the invention relates to a textile web material for producing molded parts comprising a thermoplastic matrix and reinforcing fibres embedded therein. It is thereby provided that the textile web material comprises a hybrid yarn of the type described above or is made of a hybrid yarn of the type described above. This results in the advantages mentioned above.

According to a practical refinement of the invention, the textile web material is a fabric, a knit, a weave, a mesh, or a mat. The hybrid yarn according to the invention can be processed by means of available textile machinery in a simple manner at a high level of economic efficiency, particularly into fabrics, knits, weaves, and meshes. The production of mats is more difficult, as a rule, because mats typically have to be stabilized by auxiliary means, such as by a surrounding frame. When using mats, however, there is greater freedom of design in the arrangement of the hybrid yarn, which is at least partially prescribed by the technology used for fabrics, knits, weaves, and meshes. In this manner, molded parts can be particularly well adapted to the expected mechanical loads. For example, if the molded part or a region of the molded part will be loaded in only one direction then all segments of the hybrid yarn can be placed there so that the longitudinal direction thereof matches the direction of the load.

The invention further relates to a molded part comprising a thermoplastic matrix and reinforcing fibres embedded therein. The molded part is thereby produced by hot pressing a textile web material of the type described above. This results in the advantages mentioned above.

The invention further relates to a method for producing a hybrid yarn of the type described above. It is thereby provided that a fibre bundle made of an intimate mixture of thermoplastic matrix fibres and of reinforcing fibres is produced in a method step, and that the fibre bundle is spun by means of an air-jet spinning machine in a further method step.

Other advantageous embodiments and/or refinements of the textile web material according to the invention, the molded part according to the invention, and the method according to the invention are described above and/or in the claims.

The preceding advantageous embodiments and/or refinements of the invention and/or advantageous embodiments and/or refinements of the invention described in the dependent claims can be provided individually or in arbitrary combination with each other.

BRIEF DESCRIPTION OF THE DRAWINGS

The invention and the refinements thereof and the advantages thereof are described in more detail below, using the figures. They show.

DETAILED DESCRIPTION

Figure 1:
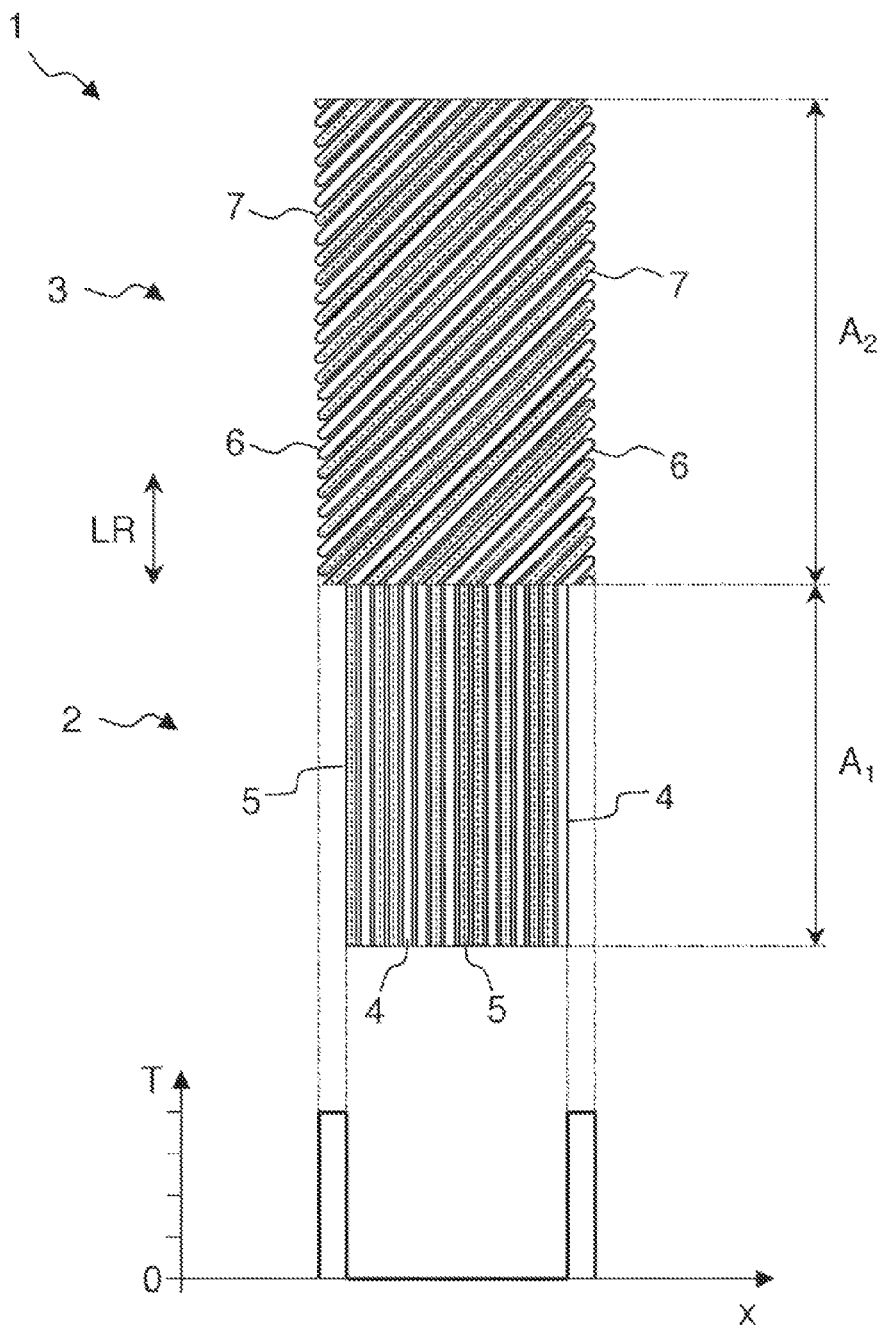
FIG. 1 an advantageous embodiment of a hybrid yarn according to the invention in a schematic side view, and FIG. 2 a block diagram of a method for producing a molded part, comprising the production of a hybrid yarn according to FIG. 1 and the production of a textile web material from the hybrid yarn.

Reference is now made to particular embodiments of the invention, one or more examples of which are illustrated in the drawings. Each embodiment is provided by way of explanation of the invention, and not as a limitation of the invention. For example, features illustrated as described as part of one embodiment may be used with another embodiment to yield still a further embodiment. It is intended that the present invention include these and other modifications and variations.

FIG. 1 shows an advantageous embodiment of a hybrid yarn 1 according to the invention in a schematic side view. A longitudinal segment $A_1$ of the hybrid yarn 1 is shown, showing only a core 2 of the hybrid yarn 1 for better clarity of the structure of the hybrid yarn 1. In a further longitudinal section $A_2$ of the hybrid yarn 1, the hybrid yarn 1 is shown in full, wherein a cover 3 of the hybrid yarn 1 covers the core 2.

The core 2 is made of staple fibres 4, 5 aligned in a straight line at least substantially in a longitudinal direction LR of the hybrid yarn 1. The staple fibres 4, 5 of the core 2 are thereby made of thermoplastic matrix fibres 4 and of reinforcing fibres 5. For reasons of clarity, only some of the staple fibres 4, 5 have reference numerals. In order to differentiate the thermoplastic matrix fibres 4 and the reinforcing fibres 5, the former are filled in white and the latter with a dashed line. The staple fibres 4, 5 forming the core 2 are made of an intimate mixture 4, 5 of thermoplastic matrix fibres 4 and reinforcing fibres 5.

The cover 3, in contrast, is made of staple fibres 6, 7 disposed helically about the staple fibres 4, 5. The staple fibres 6, 7 of the core 3 are thereby also made of thermoplastic matrix fibres 6 and of reinforcing fibres 7. Here again, only some of the staple fibres 6, 7 have reference numerals. In order to differentiate, the thermoplastic matrix fibres 6 are again filled in white and the reinforcing fibres 7 again with a dashed line. The staple fibres 6, 7 forming the cover 3 are thereby made of an intimate mixture 6, 7 of thermoplastic matrix fibres 6 and reinforcing fibres 7.

Molded parts produced from hybrid yarn 1 comprising staple fibres 4, 5, 6, 7 have a greater strength transverse to the longitudinal direction LR of the hybrid yarn 1 than such molded parts that are produced from hybrid yarns made of endless fibres, also called filaments. For molded parts in particular that are produced from textile web materials disposed in layers, the adhesion of the individual layers is improved.

The hybrid yarn 1 further comprises a lower proportion of hollow space than hybrid yarns having endless fibres, reducing the risk of undesired air inclusions when molding the molded part, that is, when consolidating the textile web material. The strength of the molded part is thereby improved.

A textile web material produced from the hybrid yarn 1 is also more drapable than a counterpart made from filaments. Wrinkle-free placement of the textile web material in the molding tool is thereby made easier, wherein the risk of damage to the structure of the textile web material is reduced at the same time. In this manner, the production costs of the molded part can be reduced. Molded parts having complex shapes can thus be produced from textile web materials, because the textile web materials better conform to the contour of the molding tool.

The use of staple fibres 4, 5, 6, 7 also reduces the risk that the fibres will be kinked during further processing, particularly when draping. This is advantageous, in turn, for the strength of the subsequent molded part.

Because both the core 2 and the cover 3 of the hybrid yarn 1 are made of staple fibres 4, 5, 6, 7, the indicated advantages obtainable by using staple fibres 4, 5, 6, 7 can be maximized.

In a lower segment of FIG. 1, the twist T in the hybrid yarn 1 according to the invention is shown as a function of the position x along a diameter of the hybrid yarn 1. It can be seen that there is no twist T in the core 2. In contrast, a substantially constant twist T occurs in the area of the cover 3.

It should be noted that FIG. 1 is an idealized representation of an embodiment of a hybrid yarn 1 according to the invention. In practice, the structure of the hybrid yarn 1 shown, having a core 2 of staple fibres 4, 5 aligned in a straight line in a longitudinal direction LR of the hybrid yarn 1 and a cover 3 of staple fibres 6, 7 disposed helically about the staple fibres 4, 5 of the core 2 is achieved to a sufficient approximation, so that the advantages according to the invention are achieved. It should also be noted that FIG. 1 is not a scale representation.

The arrangement of staple fibres 4, 5 in a straight line in the core 2 in the longitudinal direction LR of the hybrid yarn 1 thereby brings about greater strength in the subsequent molded part in the longitudinal direction LR of the hybrid yarn 1, particularly a greater tensile strength, than would be possible when using conventional hybrid yarns wherein the fibres are twisted over the entire cross section. The reason for this is that a substantial proportion of reinforcing fibres 5, 7 in the molded part, namely the reinforcing fibres 5 of the core 2 of the hybrid yarn 1, run parallel to each other in the longitudinal direction LR of the hybrid yarn 1.

If the hybrid yarn 1 is then disposed in the textile web material so that the longitudinal direction LR thereof corresponds at least in segments to a main loading direction of the subsequent molded part, then the molded part can better resist mechanical loads. In this manner, the ratio of mechanical strength to weight of the molded part can be improved.

The strength required for further processing of the hybrid yarn 1 is ensured for the hybrid yarn 1 according to the invention substantially in that the staple fibres 6, 7 forming the cover 3 are wound helically about the core 2 and therefore are twisted as a result.

The reinforcing fibres present in the cover 3 thereby improve the strength of the subsequent molded part transverse to the longitudinal direction LR of the hybrid yarn 1 captured therein, relative to such molded parts produced from hybrid yarns made of endless fibres. For molded parts that are produced from textile web materials disposed in layers, the adhesion of the individual layers can thereby be improved.

The staple fibres 4, 5 forming the core 2, just as the staple fibres 6, 7 forming the cover 3, are made of an intimate mixture 4, 5 or 6, 7 of thermoplastic matrix fibres 4 or 6 and reinforcing fibres 5, or 7. The use of intimate mixtures 4, 5 or 6, 7 ensures that the thermoplastic matrix fibres 4, 6 and the reinforcing fibres 5, 7 are homogenously distributed in the textile web material produced from the hybrid yarn 1. In this manner, it can be achieved that the reinforcing fibres 5, 7 are completely coated when the thermoplastic matrix fibres 4, 6 are melted, so that the interaction between the thermoplastic matrix and the reinforcing fibres 5, 7 in the subsequent molded part are maximized by improved adhesive bonding, so that a molded part having high mechanical strength and simultaneously low weight is produced.

The volume-based proportion of reinforcing fibres 5, 7 of the intimate mixture 4, 5 or 6, 7 can advantageously be at least 40%, preferably at least 45%, particularly preferably at least 50%. The volume-based proportion of thermoplastic matrix fibres 4, 6 of the intimate mixture 4, 5 or 6, 7 can further advantageously be at least 20%, preferably at least 30%, particularly preferably at least 35%.

The intimate mixtures 4, 5 and 6, 7 can fundamentally be different with respect to the thermoplastic matrix fibres 4 or 6 present therein. For example, it is conceivable to have a different material composition and/or different size, particularly different thickness and/or staple length. The intimate mixtures 4, 5 and 6, 7 can also be different with respect to the material and/or size of the reinforcing fibres 5 or 6 present therein. It is thereby also possible that the proportionate composition of the intimate mixture 4, 5 is different from the proportionate composition of the intimate mixture 6, 7. Preferably, however, the intimate mixture 4, 5 forming the core 3 and the intimate mixture 6, 7 forming the cover correspond with respect to the material and the dimensions of the staple fibres 4, 5; 6, 7 thereof.

For the hybrid yarn 1, the sum of the volume-based proportion of thermoplastic matrix fibres 4, 6 and the volume-based proportion of reinforcing fibres 5, 7 in the hybrid yarn 1 is at least 90%, preferably at least 95%, particularly preferably at least 98%. The remaining volume proportions can be due to a sizing or binding agent.

The staple fibres 4, 5 forming the core 2 and/or the staple fibres 6, 7 forming the cover 3 can thereby comprise a length of at least 2.5 cm, preferably of at least 5 cm, particularly preferably of at least 10 cm, and/or a length of no greater than 25 cm, preferably no greater than 20 cm, particularly preferably no greater than 15 cm.

The thermoplastic matrix fibres 4, 6 particularly comprise a maximum yarn count based tensile strength of at least 20 cN/tex, preferably of at least 30 cN/tex, particularly preferably of at least 50 cN/tex. The thermoplastic matrix fibres 4, 6 thereby preferably comprise polyurethane fibres, polyamide fibres, and/or polyester fibres. The thermoplastic matrix fibres 4, 6 of the hybrid yarn 1 are thereby made of a single material.

The reinforcing fibres 5, 7 comprise a maximum yarn count based tensile strength of at least 100 cN/tex, preferably of at least 150 cN/tex, particularly preferably of at least 200 cN/tex. The reinforcing fibres 5, 7 preferably comprise glass fibres, carbon fibres, and/or aramide fibres. The reinforcing fibres 5, 7 are preferably made of a single material.

The rotation coefficient $\alpha_m$ of the hybrid yarn 1 is advantageously no greater than 200, preferably no greater than 170, particularly preferably no greater than 150, and/or at least 70, preferably at least 90, particularly preferably at least 110.

The hybrid yarn 1 preferably comprises a total titer of at least 100 dtex, preferably of at least 150 dtex, particularly preferably of at least 200 dtex, and/or of no greater than 15000 dtex, preferably no greater than 12000 dtex, particularly preferably no greater than 10000 dtex. The proportion of the staple fibres forming the cover can thereby be at least 5%, preferably at least 10%, particularly preferably at least 15%, and/or no greater than 45%, preferably no greater than 35%, particularly preferably no greater than 25% with respect to the staple fibres. The snarling tendency of the hybrid yarn 1 can particularly be no greater than 200 1/m, preferably no greater than 180 1/m, particularly preferably no greater than 160 1/m.

Figure 2:
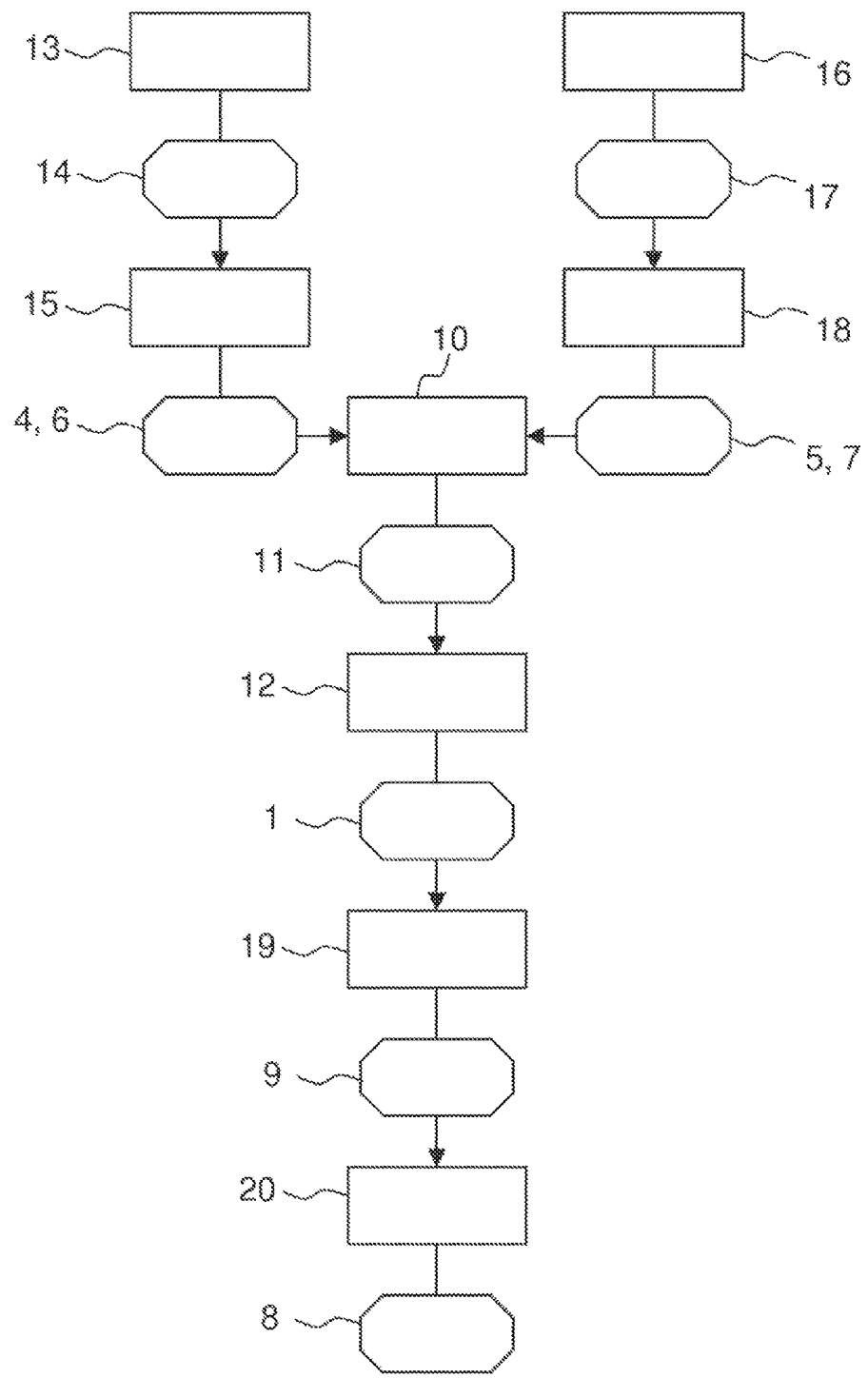

FIG. 2 shows a method for producing a molded part 8, comprising the production of a hybrid yarn 1 according to FIG. 1 and the production of a textile web material 9 from the hybrid yarn 1. Method steps are thereby represented as rectangles and the results of the method steps are represented by octagons.

The production of the hybrid yarn 1 comprises a method step 10 for producing a substantially untwisted fibre bundle 11 made of an intimate mixture 4, 5, 6, 7 of thermoplastic matrix fibres 4, 6 and of reinforcing fibres 5, 7.

The method step 10 can be designed so that staple fibres 4, 5 present as flocking and being thermoplastic matrix fibres 4, 5, and staple fibres 6, 7 present as flocking and being reinforcing fibres 6, 7, are fed into a flocking mixing machine. An intimate mixture 4, 5, 6, 7 can thereby be produced in the form of flocking, which can then be fed to a carding machine. The intimate mixture 4, 5, 6, 7 can be formed into a fibre bundle by means of the carding machine. The fibre bundle can then optionally be fed singly or multiply by means of a drawing frame and thereby refined and/or made uniform, so as to result in a spinnable fibre bundle 11 comprising an intimate mixture of thermoplastic matrix fibres 4, 5 and of reinforcing fibres 6, 7, each in staple form.

Alternatively, the method step 10 can be designed so that the staple fibres 4, 5 present as flocking and being thermoplastic matrix fibres 4, 5 are formed by means of a carding machine into a fibre bundle of a first type, comprising substantially thermoplastic matrix fibres 4, 5. A fibre bundle of a second type is also produced by means of a carding machine from the staple fibres 6, 7 present as flocking and being reinforcing fibres 6, 7, comprising substantially reinforcing fibres 6, 7. By jointly drawing at least one fibre bundle of the first type singly or multiply, and at least one fibre band of the second type, by means of a doubling draw frame, a spinnable fibre bundle 11 can be produced, comprising an intimate mixture of thermoplastic matrix fibres 4, 5 and of reinforcing fibres 6, 7, each in staple form.

In a method step 12, the fibre bundle 11 is then fed to an air-jet spinning machine. The substantially non-twisted fibre bundle 11 is thereby drawn to the desired fineness and fed through an airflow providing a false twist to the drawn fibre bundle 11. The outer staple fibres 6,7 of the drawn fibre bundle 11 are thereby twisted substantially more than the inner staple fibres 4, 5. When the drawn fibre band 11 is transported further, the false twist is substantially released, wherein the untwisted core 2 and the twisted cover 3 of the hybrid yarn 1 are formed.

The air-jet spinning machine can thereby operate according to a dual jet air-jet spinning method. For such a method, the false twist generated by means of a first rotation jet is relieved by means of a second rotation jet acting in the opposite direction.

Alternatively, the air-jet spinning machine can be based on a single jet air-jet spinning method. For such a method, the hybrid yarn 1 is formed by means of only one rotation jet disposed so that part of the outer staple fibres 6, 7 are spread apart prior to twisting. The spread staple fibres 6, 7 are then wound about the core 2 when backing.

The staple fibres 4, 6 made of thermoplastic material and fed to the method step 10 can be produced in that endless fibres 14 made of thermoplastic material are first produced in a method step 13. The endless fibres 14 can be generated by melt spinning, for example. In a further method step 15, the endless fibres 14 can be brought to the required orientation, for example by cutting or by tearing to the required length, giving rise to the staple fibres 4, 6.

Similarly, the staple fibres 5, 7 made of reinforcing material and fed to the method step 10 can be produced in that endless fibres 17 made of reinforcing material are first produced in a method step 16. The endless fibres 17 can also be generated by melt spinning, for example. In a further method step 18, the endless fibres 17 can be trimmed, for example by cutting or by tearing to the required length, giving rise to the staple fibres 5, 7.

In order to then produce a textile web material 9 from the hybrid yarn 1, a method step 19 is provided. This step can comprise a typical method for producing a fabric, a knit, a weave, a mesh, or a mat.

A molded part 8 can be produced from the textile web material 9 so produced, or from a plurality of textile web materials 9 so produced, in a method step 20 by consolidating the thermoplastic matrix fibres 4, 6. Known hot pressing methods can be used here.

The novel molded part 8 thereby obtains the superior mechanical properties thereof substantially by the use of the hybrid yarn 1 described above when producing the molded part.

Modifications and variations can be made to the embodiments illustrated or described herein without departing from the scope and spirit of the invention as set forth in the appended claims.

The invention claimed is:

1. A hybrid yarn for producing molded parts, comprising:
   a core comprised substantially of staple fibers aligned in a longitudinal direction of the hybrid yarn;
   a cover comprised substantially of staple fibers wound helically around the core; and
   wherein the staple fibers of the core and the cover further comprise a homogeneous mixture of thermoplastic matrix fibers and reinforcing fibers; and
   wherein the hybrid yarn is an air-jet spun yarn.

2. The hybrid yarn as in claim 1, wherein the reinforcing fibers of the cover and of the core comprise at least 40% by volume of the homogeneous mixture of staple fibers of the cover and the core, respectively.

3. The hybrid yarn as in claim 1, wherein the thermoplastic matrix fibers of the cover and of the core comprise at least 20% by volume of the homogeneous mixture of staple fibers of the cover and the core, respectively.

4. The hybrid yarn as in claim 1, wherein the homogeneous mixture of staple fibers forming of the core corresponds to the same homogeneous mixture of staple fibers forming the cover.

5. The hybrid yarn as in claim 1, wherein a volume-based sum of the thermoplastic matrix fibers and the reinforcing fibers of the cover and core is at least 90% of the hybrid yarn.

6. The hybrid yarn as in claim 1, wherein the staple fibers forming the core and the cover have a staple length of between 2.5 cm and 20 cm.

7. The hybrid yarn as in claim 1, wherein the thermoplastic matrix fibers of the cover and the core have a maximum yarn count based tensile strength of at least 20 cN/tex.

8. The hybrid yarn as in claim 1, wherein the thermoplastic matrix fibers of the cover and the core are made of the same material comprising one of polyurethane fibers, polyamide fibers, polyether ketone fibers, polypropylene fibers, acryl nitrile butadiene styrene fibers, or polyester fibers.

9. The hybrid yarn as in claim 1, wherein the reinforcing fibers of the cover and the core have a maximum yarn count based tensile strength of at least 100 cN/tex.

10. The hybrid yarn as in claim 1, wherein the reinforcing fibers of the cover and the core are made of the same material comprising one of glass fibers, carbon fibers, or aramide fibers.

11. The hybrid yarn as in claim 1, wherein the hybrid yarn has a rotation coefficient ($\alpha_m$) between 70 and 200.

12. The hybrid yarn as in claim 1, wherein the hybrid yarn has a total titer of between 100 dtex and 15000 dtex.

13. The hybrid yarn as in claim 1, wherein a volume-based proportion of the staple fibers forming the cover relative to the total staple fibers is between 2% and 45%.

14. The hybrid yarn as in claim 1, wherein the hybrid yarn has a snarling tendency no greater than 200 1/m.

15. The hybrid yarn as in claim 1, wherein the hybrid yarn is one of a single jet air-jet spun yarn or dual jet air-jet spun yarn.

16. A textile web material for producing molded parts having a thermoplastic matrix and reinforcing fibers embedded therein, the textile web material formed from a hybrid yarn, the hybrid yarn further comprising:
   a core comprised substantially of staple fibers aligned in a longitudinal direction of the hybrid yarn;
   a cover comprised substantially of staple fibers wound helically around the core; and
   wherein the staple fibers of the core and the cover further comprise a homogeneous mixture of thermoplastic matrix fibers and reinforcing fibers; and
   wherein the hybrid yarn is an air-jet spun yarn.

17. The textile web material as in claim 16, wherein the textile material is one of a fabric, a knit, a weave, a mesh, or a mat.

18. A hot-pressed molded part comprising a thermoplastic matrix and reinforcing fibers embedded therein, the molded part hot-pressed from a textile web material formed from a hybrid yarn, the hybrid yarn further comprising:
   a core comprised substantially of staple fibers aligned in a longitudinal direction of the hybrid yarn;
   a cover comprised substantially of staple fibers wound helically around the core; and
   wherein the staple fibers of the core and the cover further comprise a homogeneous mixture of thermoplastic matrix fibers and reinforcing fibers.

* * * * *